United States Patent [19]

Takahashi

[11] Patent Number: 5,991,255
[45] Date of Patent: Nov. 23, 1999

[54] OPTICAL HEAD USING A LIGHT BLOCKING DEVICE TO LOWER THE NUMERICAL APERTURE OF AN INCIDENT BEAM

[75] Inventor: Junichi Takahashi, Tokyo, Japan

[73] Assignee: NEC Corporation, Tokyo, Japan

[21] Appl. No.: 08/958,296

[22] Filed: Oct. 27, 1997

[30] Foreign Application Priority Data

Oct. 28, 1996 [JP] Japan .................................. 8-285482

[51] Int. Cl.⁶ .................................................. G11B 7/135
[52] U.S. Cl. ..................... 369/112; 369/44.24; 369/94; 369/118
[58] Field of Search ........................... 369/112, 94, 118, 369/110, 116, 109, 44.23, 44.24, 44.37; 250/201.5

[56] References Cited

U.S. PATENT DOCUMENTS

| | | | |
|---|---|---|---|
| 5,231,624 | 7/1993 | Finegan | 369/116 |
| 5,659,533 | 8/1997 | Chen et al. | 369/112 |
| 5,665,957 | 9/1997 | Lee et al. | 250/201.5 |
| 5,793,734 | 8/1998 | Tsuchiya et al. | 369/112 |
| 5,809,000 | 9/1998 | Choi | 369/112 |
| 5,822,295 | 10/1998 | Sohumta | 369/118 |
| 5,867,468 | 2/1999 | Mori et al. | 369/112 |

FOREIGN PATENT DOCUMENTS

| | | |
|---|---|---|
| 5-120720 | 5/1993 | Japan . |
| 7-105566 | 4/1995 | Japan . |
| 7-98431 | 4/1995 | Japan . |

OTHER PUBLICATIONS

Yoshiaki Komma et al., "Dual Focus Optical Head with a Hologram–Integrated Lens", *1996 Technical Digest Series*, vol. 12, Jul., 1996, pp. 314–316.

Man–Hyung Lee et al, "Liquid Crystal Shutter–Optical Head for DVD Player with CD Compatibility", *1996 Technical Digest Series,* vol. 12, Jul., 1996, pp. 317–319.

Seiji Kajiyama et al., "DVD/CD Compatible Pick–Up Using Liquid Crystal Shutter", *1996 Technical Digest Series,* vol. 12, Jul., 1996, pp. 320–322.

Ryuichi Katayama et al., "Dual Wavelength Optical Head for 0.6mm and 1.2mm Substrate Thickness", *1996 Technical Digest Series,* vol. 12, Jul., 1996, pp. 323–325.

Chul Woo Lee et al., "A Compact Disc Compatible Digital Video Disc Pickup Using Annular Mask", *1996 Technical Digest Series,* vol. 12, Jul., 1996, pp. 348–350.

*Primary Examiner*—Ali Neyzari
*Assistant Examiner*—Kim-Kwok Chu
*Attorney, Agent, or Firm*—Sughrue, Mion, Zinn, Macpeak & Seas, PLLC

[57] ABSTRACT

It is an object of the invention to provide a compatible optical head apparatus for optical disks with different thicknesses. A laser beam emitted by a semiconductor laser is convert into a collimated laser beam by a collimator lens and passes through a circular aperture, hence an effective NA of an objective lens is reduced. Accordingly, the effective NA for the incident laser beam on the optical disks is lower than that for the reflected laser beam from the optical disk by more than 0.1. Moreover, in the optical head apparatus according to another embodiment, another semiconductor laser with a different lasing wavelength is provided, and when a recorded signal of the optical disk with a wavelength dependent characteristic is reproduced, only one of the semiconductor lasers is activated in accordance with the characteristic of the optical disk to be reproduced.

6 Claims, 6 Drawing Sheets

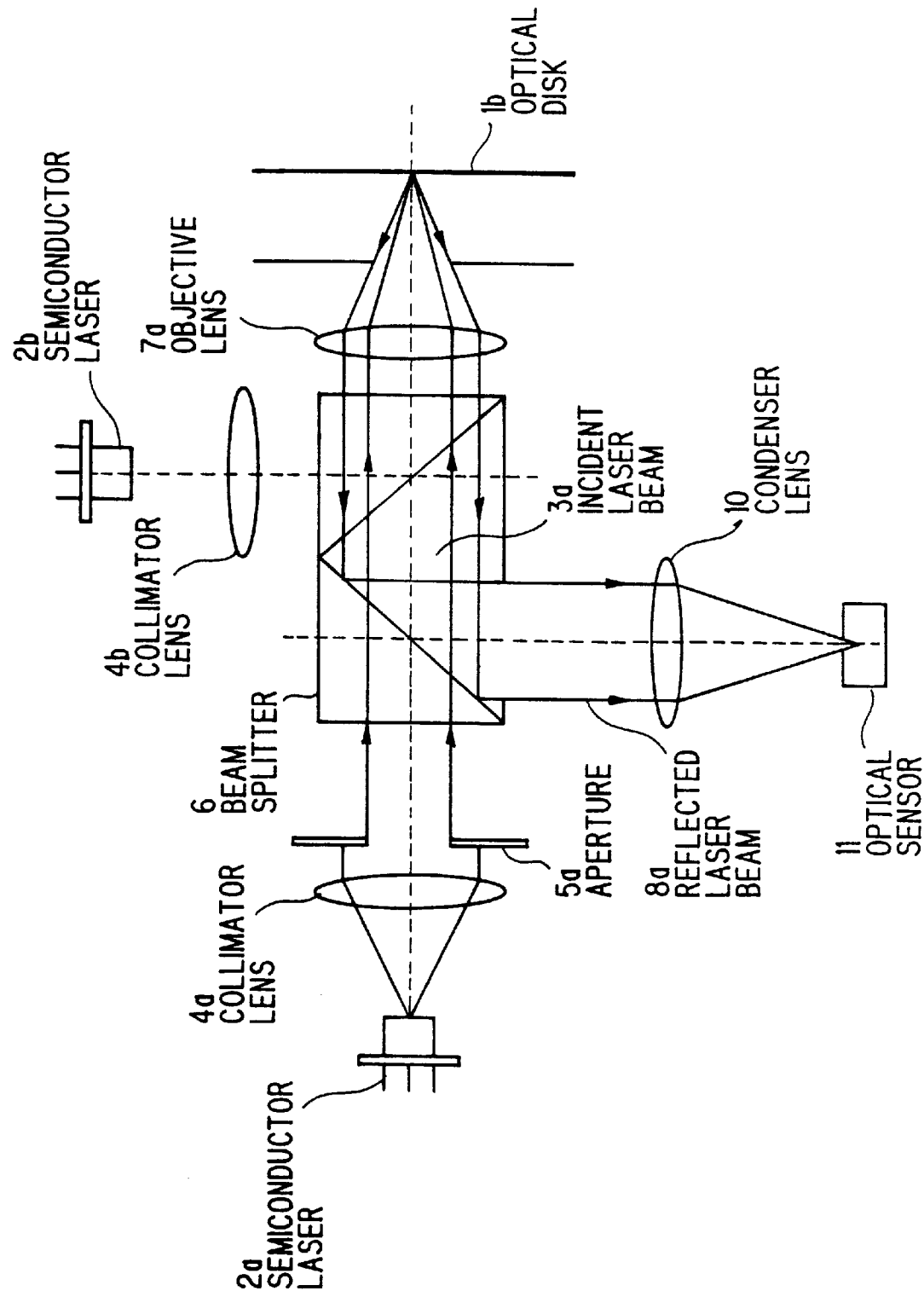

OPTICAL HEAD USING A LIGHT BLOCKING DEVICE TO LOWER THE NUMERICAL APERTURE OF AN INCIDENT BEAM

FIELD OF THE INVENTION

The invention relates to an optical head apparatus for reproducing information recorded in an optical data storage, such as an optical disk, and especially to a compatible optical head apparatus for the optical disks with different substrate thicknesses, which can compensate spherical aberration caused by the objective lens in conformity with the difference in the substrate thickness of the optical disk.

BACKGROUND OF THE INVENTION

Technologies on the optical memory concerned with the optical disk with large capacity and high density have come to be used for various purposes, such as digital audio and video disks and data files, and the digital video disk with large capacity and high density being seven times as much as those of the conventional one is put to practical use. In the technology on the optical memory, since information is recorded and reproduced through a laser beam having a spot size in the order of micro meter with high reliability, it is very important to develop the optical head apparatus with high quality and excellent performance.

Fundamental functions of the optical head apparatus realized by the intensive optical technology are classified into a function of a spot-focussing to the limit of diffraction, that of focus-controlling of the spot, that of pit signal-detecting by the spot and that of track-controlling of the spot.

These functions are actualized by combining various optical instruments and optical to electrical converters in accordance with their purposes and their usages.

Recently, high density optical disk systems employing 0.6 mm substrate thickness, such as Digital Video Disk (DVD, hereinafter) have been standardized. In these systems, compatibility with conventional optical disk systems employing 1.2 mm substrate thickness, such Compact Disk (CD, hereinafter), is strongly required. In case of reading a 0.6 mm disk and a 1.2 mm disk using the same optical head apparatus, it is necessary to compensate spherical aberration due to the difference in the substrate thickness. Several kinds of optical head apparatus have been proposed for the same purpose, such as a twin lens type, a variable aperture type and a dual focus type. However, the optical head apparatus of the aforementioned types comprise complicated mechanisms for adjusting focuses, are weighty and high-priced and deteriorate aberration characteristic, performance of recorded signal-reproducing characteristic, access speed and bit rate of data translation.

SUMMARY OF THE INVENTION

Accordingly, it is an object of the invention to produce an optical head apparatus, which overcomes the aforementioned disadvantages by a simple structure, can reproduce a signal recorded on an optical disk with high density by using an objective lens of high numerical aperture and are applicable to the optical disks having different substrate thicknesses.

According to a feature of the invention, an optical head apparatus comprises:

a semiconductor laser for irradiating an optical disk, an objective lens for both focussing an incident laser beam emitted by the semiconductor laser and collimating a reflected laser beam from the optical disk, means for so limiting an effective diameter of the incident laser beam that an effective numerical aperture (NA, hereinafter) of the objective lens for the incident laser beam is equivalently reduced, means for so collimating the whole reflected laser beam that the effective NA of the objective lens for the reflected laser beam is higher than that for the incident laser beam by more than 0.1, and means for reproducing a signal recorded on the optical disk based on the reflected laser beam focussed thereon.

BRIEF DESCRIPTION OF THE DRAWINGS

The invention will be explained in more detail in conjunction with appended drawings, wherein:

FIG. 7 is a block diagram of the other optical head apparatus shown as the third preferred embodiment of the invention, which reproduces a thick optical disk using a high NA lens.

DESCRIPTION OF THE PREFERRED EMBODIMENT

Before explaining an optical head apparatus in the preferred embodiments of the invention, the aforementioned conventional optical head apparatus will be explained referring to the appended drawings.

Figure 1:
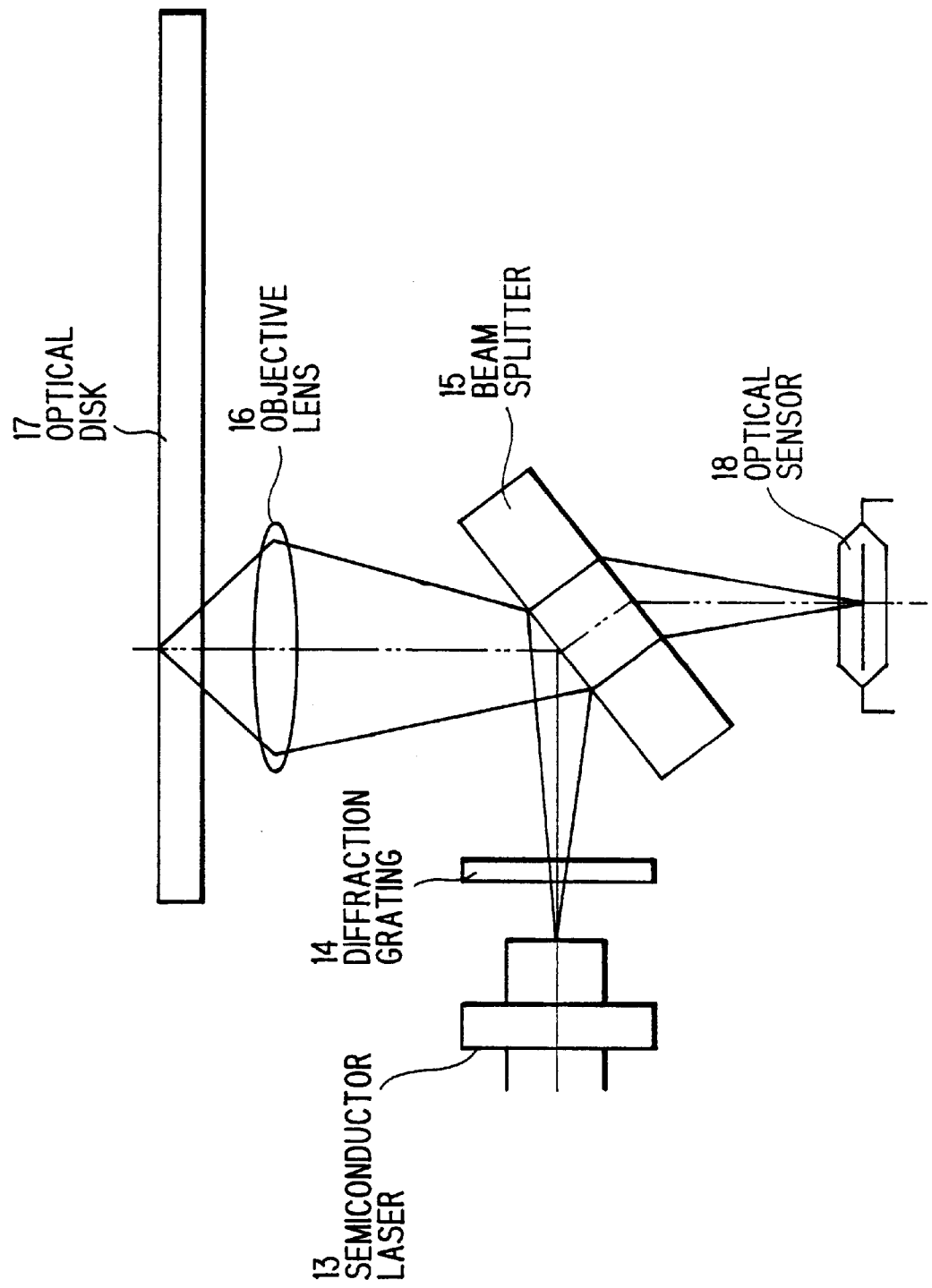
FIG. 1 is a block diagram showing an optical configuration of a conventional optical head apparatus.

FIG. 1 shows a block diagram of an example of the conventional optical head apparatuses.

The conventional optical head apparatus shown in FIG. 1 is so constructed that an optical disk 17 is irradiated by a laser spot and a signal recorded on the optical disk 17 is reproduced by detecting a state of a signal-recording surface of the optical disk 17. An optical hardware in the optical head apparatus is composed of a semiconductor laser 13, a diffraction grating 14, a beam splitter 15, an objective lens 16 and an optical sensor 18. A laser beam focuses a spot on the optical disk 17, and a reflected laser beam serves as a reproduced signal laser beam.

The laser beam emitted by the semiconductor laser 13 is diffracted by the diffraction grating 14, converted into three diffracted beams for detecting tracking error signals, reflected by the beam splitter 15 and focussed by the objective lens 16. The reflected laser beam from the signal-recording surface of the optical disk 17 incidents on a light-receiving surface of the optical sensor 18 via the objective lens 16 and the beam splitter 15, and is converted into an electrical signal, which serves as an information signal.

In a conventional focussing error signal-detecting system for controlling the spot following vertical deviation of the optical disk 17, the laser beam reflected from the optical disk again incidents on the objective lens 16, astigmatic aberration occurs on the beam splitter 15, the laser beam influenced by astigmatic aberration is led to a signal detection optics and incidents on the optical sensor 18, and focussing error is detected therein.

According to the aforementioned configuration, if the spot on the optical disk 17 is out of focus, an error signal is generated in accordance with vertical deviation of the optical disk 17, a control signal for compensating the error signal is applied to a lens actuator, and the spot is controlled to be always in focus.

Detection of a tracking error signal for following eccentricity of the optical disk 17 is carried out as follows. The aforementioned three diffracted beams formed by the diffraction grating 14 irradiate the optical disk 17, rotational positioning of the diffraction grating 14 is so adjusted that the +1st-order and −1st-order diffracted beams are respectively positioned before and after the zero-order diffracted beam regarding the direction of onward movement of tracking pits, and the tracking error signal can be obtained as the difference between signal components in reflected beams which respectively correspond to the +1st- and −1st-order diffracted beams.

Similarly to the case of the focussing error-compensating, when the focussed spot on the optical disk 17 deviates from the track to be traced, the error signal is generated in accordance with the eccentricity of the optical disk. Then, the focussed spot can be always situated on the track to be traced by applying a control signal for compensating the error signal to the lens actuator.

Although the focussed spot with a diameter of about 1 μm deviates from the information-recording track by vertical deviation and eccentricity of the optical disk, the objective lens is supported by the lens actuator, which is movable in both the focussing and tracking directions, and the focussed spot can trace the information-recording track with high accuracy.

Increase of the stored data of the optical memory mentioned in the above is earnestly required, and miniaturization of the focussed spot for irradiating the optical disk is indispensable for increasing recording density.

The spot size of the focussed laser beam on the optical disk depends on the lasing wavelength λ of the semiconductor laser and the NA of the objective lens. Accordingly, the optical head apparatus is designed in such a way that λ is small and NA is large.

Next, the situation of the focussed spot of the laser beam in the conventional optical head apparatus will be explained referring to the appended drawings for the case that the substrate thickness of the optical disk is changed.

Figure 2A:
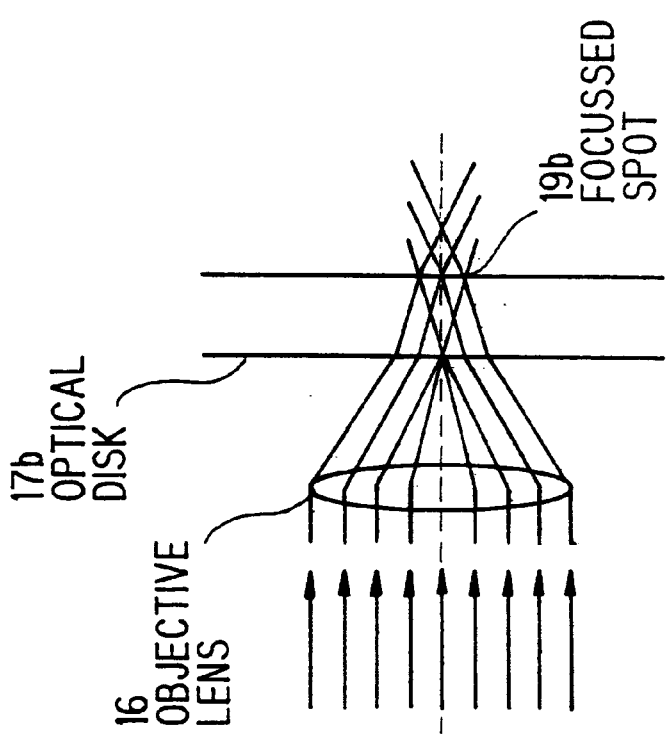
FIGS. 2A to 2B show situations of focussed spots in a conventional optical head apparatus in case that thickness of optical disk substrates are changed.
Figure 2B:
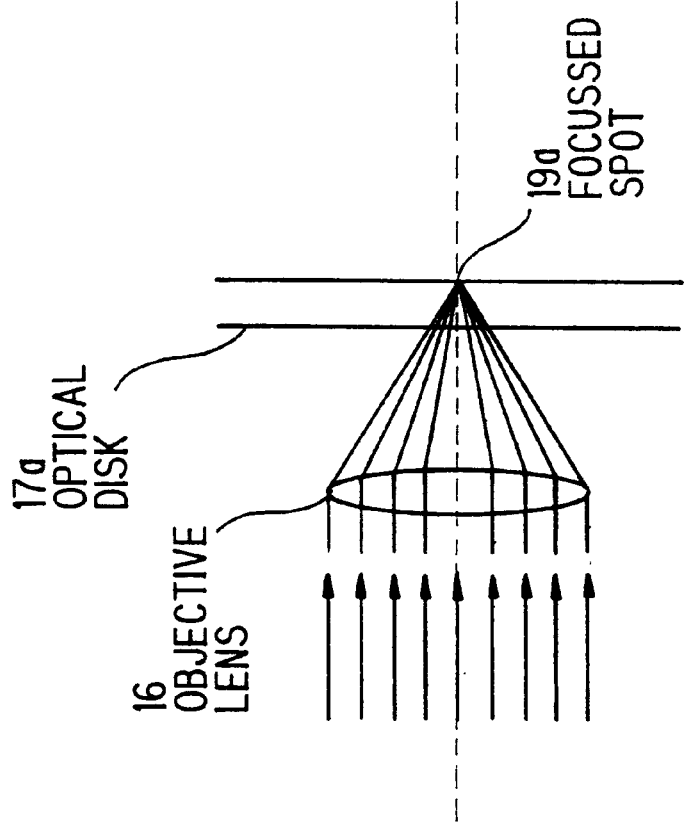

FIGS. 2A to 2B show the situations of the focussed spots of the laser beam formed by the objective lens in the conventional optical head apparatus, when the substrate thickness of the optical disk is changed.

FIG. 2A shows the situation of the focussed spot 19a for the case that the substrate thickness of the optical disk 17a is thin.

As shown in FIG. 2A, the light emitted from the semiconductor laser is focussed by the objective lens 16 to form a focussed spot 19a. The focussed spot 19a irradiates the information recording-surface on the optical disk 17a and reproduces the recorded signal.

When the substrate thickness of the optical disk 17b is increased, the situation of the spot 19b is changed as shown in FIG. 2B. The laser beam passing through the objective lens 16 dose not form a focussed spot on account of spherical aberration caused by the difference in the substrate thickness and this lens can not meet the requirement therefor.

As mentioned in the above, when the substrate thickness of the optical disk is changed, the situation of the focussed laser beam deviates from the designed one, and the recorded signal cannot be successfully reproduced on account of spherical aberration. In order to cope with the aforementioned situation, an optical head apparatus provided with another objective lens, that provided with a variable NA objective lens (Japanese Patent Kokai 7-105566) and that provided with a dual focus objective lens integrated with a hologram (Japanese Patent Kokai 7-98431) have been proposed.

Disadvantage of the optical head apparatus provided with the two objective lenses are summarized as follows. The number of structural elements of the optical head apparatus increases, hence it is high-priced. Furthermore, since the two objective lenses mounted on the lens actuator are interchanged in accordance with the kinds of the optical disks, mechanism for the lenses-interchanging is complicated in order to achieve high accuracy in lens-positioning. In the optical head apparatus having the objective lens with variable NA, since NA is changed in accordance with the kinds of the optical disks, complicated mechanism becomes necessary in this apparatus also. Moreover, in the optical head apparatus utilizing the objective lens provided with a liquid crystal shutter, which is disclosed in Japanese Patent Kokai 5-120720, the objective lens must be fabricated by using a liquid crystal as a material, which promotes aberration. In the dual focus objective lens integrated with a hologram, since diffracted beams transmitting through a single objective lens are used, optical losses are more than 50% for both the focuses and efficiency of laser beam utilization is unsatisfactory as the optical head apparatus.

As mentioned in the above, the point of issue on the conventional optical head apparatus is that, when the substrate thickness of the optical disk is changed, the situation of the focussed spot deviates from the designed one and spherical aberration occurs, and the recorded signal on the optical disk cannot be successfully reproduced.

The reason is that the NA of the objective lens is designed to be high in order to reproduce the recorded signal on the optical disk of high density. Accordingly, aberration in the focussed spot is sensitive to the change of the substrate thickness of the optical disk and the desired spot size cannot be secured.

Figure 3:
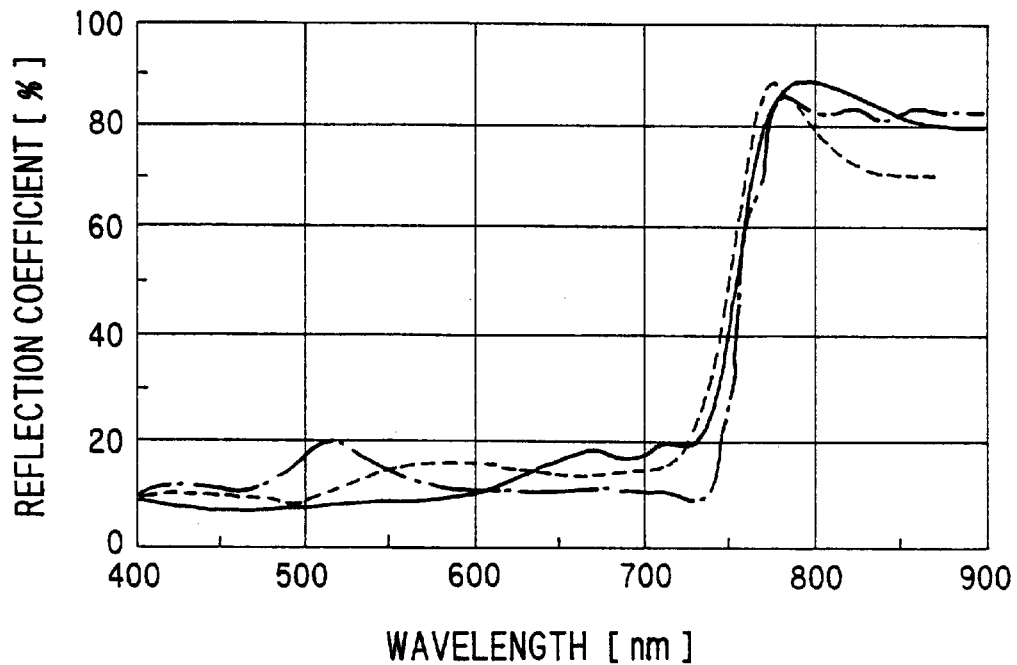
FIG. 3 shows a reflection coefficient of CD-R as a function of wavelength of an incident laser beam.

Furthermore, when the reflection coefficient of the material composing the optical disk is represented a function of the wavelength of the incident laser beam, it sometimes occurs that the CD/DVD compatible optical head apparatus cannot be realized. Explaining more concretely, FIG. 3 shows the reflection coefficient of a CD-R (Write Once Memory) as the function of the wavelength of the incident laser beam. The reflection coefficient is more than 70% for the laser beam with the wavelength of 780 nm, which is widely used for the CD, and the CD-R can be satisfactorily recorded and reproduced by the laser beam of 780 nm wavelength. On the otherhand, the reflection coefficient of the CD-R abruptly decreases for the wavelength less than 780 nm. Accordingly, the CD-R cannot be recorded and reproduced by the laser beam with the wavelength of about 650 nm, which is commonly used for recording and reproducing the DVD with high information density.

Next, the embodiments of the invention will be explained referring to the appended drawings.

Figure 4:
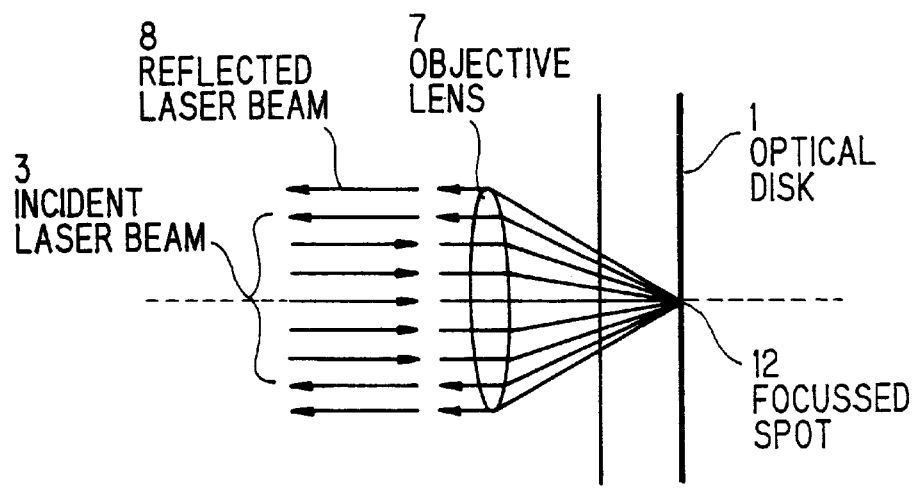
FIG. 4 shows a relation between an objective lens and incident and reflected laser beams, which explains a principle of an optical head apparatus according to the invention.

As shown in FIG. 4, in an embodiment of the invention, since a diameter of the incident laser beam 3 on an objective lens 7 is smaller than its effective diameter, a NA of the objective lens 7 is equivalently reduced. On the other hand, a signal laser beam reflected by an optical disk 1 covers a whole effective area of the objective lens 7 to increase its effective NA, hence the effective NA of the objective lens 7 for the incident laser beam is considerably different from that for the reflected laser beam. Accordingly, since the effective NA of the objective lens 7 is optimally determined in consideration of a trade-off relation between the spot size and spherical aberration in this novel structure, there arises no undesirable influence of spherical aberration on recorded signal-reproducing, even when the substrate thickness of the optical disk is changed. In the conventional optical head apparatus, when spherical aberration occurs, the diameter of the focussed spot increases to a dimension, which is too large for recorded signal-reproducing, hence the recorded signal cannot be successfully reproduced. However, in the optical head apparatus according to the invention, the focussed spot with a diameter, which is small enough to reproduce the recorded signal on the optical disk, can be obtained by selecting the optimum spot size and aberration related thereto. The reflected laser beam 8 from the optical disk 1 again incidents on the objective lens 7. In the conventional optical head apparatus, the laser beam diffracted by the information pit cannot return to the optical sensor, because it is limited by the NA of the objective lens. On the other hand, in the optical head apparatus according to the invention, since the NA of the objective lens 7 for the reflected laser beam 8 is high, the laser beam diffracted by the information pit can return to the optical sensor 9 also. Since the signal component with higher level in the reflected laser beam can be received by the optical sensor 9, S/N ratio of the output signal of the optical sensor 9 is improved and influence of spherical aberration can be relatively reduced. According to the results of calculations carried out by the inventors, it is advisable that the effective NA of the objective lens for the reflected laser beam is higher than that for the incident laser beam by more than 0.1.

Figure 5:
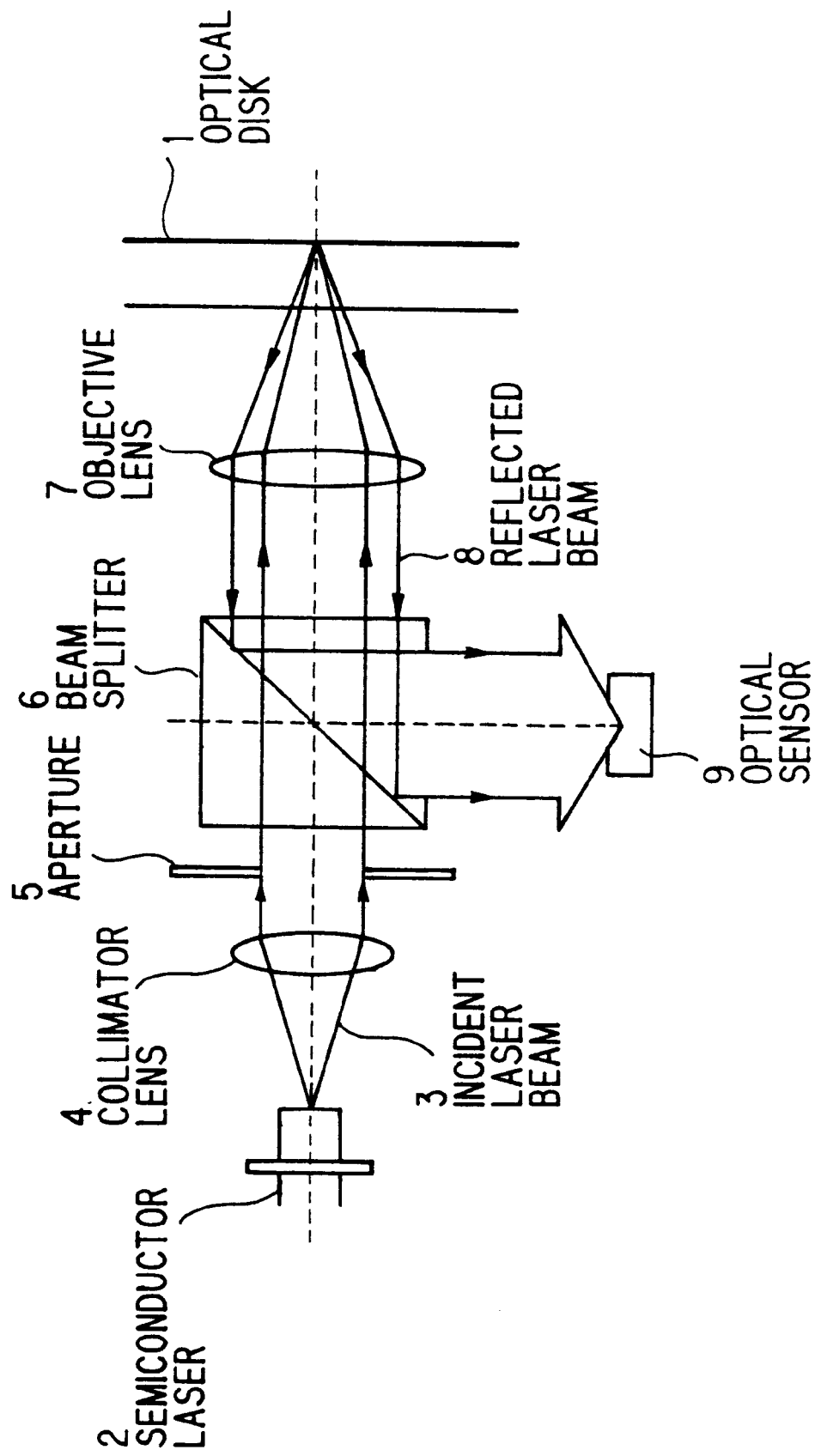
FIG. 5 is a block diagram of an optical head apparatus shown as the first preferred embodiment of the invention.

Next, the first preferred embodiment of the invention will be explained referring to FIG. 5.

In this optical head apparatus shown as the embodiment of the invention, an incident laser beam 3 emitted by a semiconductor laser 2 is converted into a collimated laser beam by a collimator lens 4, and passes through an aperture 5, hence the diameter of the incident laser beam 3 on the objective lens 7 and the effective NA of the objective lens 7 are reduced.

Since the reflected laser beam 8 from the optical disk 1 is not influenced by the aperture 5, it incidents on the whole effective area of the objective lens 7. Accordingly, the reflected laser beam 8 detects the recorded signal on the optical disk through the high NA. The signal laser beam passing through the whole effective area of the objective lens 7 is reflected by a beam splitter 6 and guided to an optical sensor 9. The optical sensor 9 is composed of a focussing error-detecting circuit, a tracking error-detecting circuit and a signal-reproducing circuit, which have been commonly used in the conventional optical head apparatus.

Next, the second preferred embodiment of the invention will be explained referring to FIGS. 6 to 7.

Figure 6:
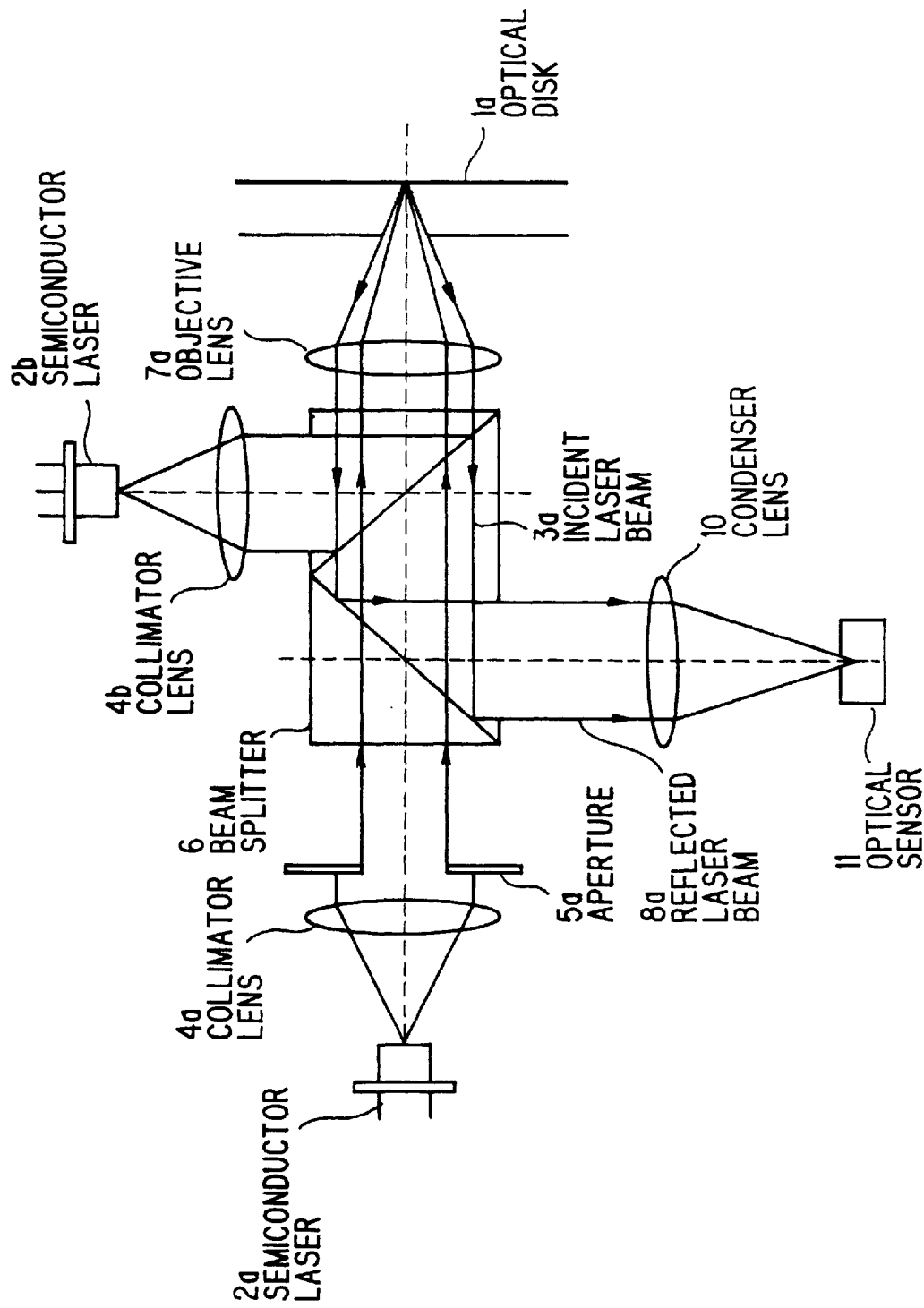
FIG. 6 is a block diagram of another optical head apparatus shown as the second preferred embodiment of the invention, which reproduces a thin optical disk using a high NA lens.

FIGS. 6 to 7 show an example of a compatible optical head apparatus for reproducing an optical disk with wavelength dependent characteristic. FIG. 6 is a block diagram showing an operation of the optical head apparatus according to the invention, when it is used for reproducing a recorded signal on the thin optical disk 1a, and FIG. 7 is a block diagram of the same, when it is used for reproducing a recorded signal on the thick optical disk 1b.

As shown in FIG. 6, when the recorded signal on the thin optical disk 1a is reproduced, since the objective lens 7a is designed in conformity with the thin optical disk 1a, both the semiconductor lasers 2a and 2b can be used as the laser light sources. When the optical disk 1a has a wavelength dependent characteristic shown in FIG. 3, one of the semiconductor lasers 2a and 2b can be selected in accordance with the wavelength suited for the optical disk 1a.

When the semiconductor laser 2b is selected, the emitted laser beam passes through a collimator lens 4b, is reflected by the beam splitter 6 and led to the objective lens 7a. In this case, the NA of the objective lens 7a is identical for both an incident laser beam on the optical disk 1a and a reflected laser beam from the same.

When the recorded signal on the thick optical disk 1b is reproduced by the optical head apparatus according to the invention as shown in FIG. 7, only the semiconductor laser 2a turns on, and the laser beam emitted from the semiconductor laser 2a passes through the collimator lens 4a and the aperture 5a, and is led to the objective lens 7a. Since the effective diameter of the incident laser beam 3a on the objective lens 7a is limited by the aperture 5a, the NA of the objective lens 7a for the laser beam directed to the optical disk 1b is different from that of the reflected laser beam from the same.

The laser beam reflected by the optical disk 1b covers the whole surface of the objective lens 7a, again incidents on the beam splitters on the beam splitter 6 and is reflected thereby. The reflected laser beam 8a passes through a condenser lens 10, is directed to the optical sensor 11 and focussed thereon.

The outstanding effect of the invention is that the optical disks with the different substrate thicknesses can be reproduced by the same optical head apparatus. Moreover, when the optical head apparatus is applied to the thin optical disk, its beam tilt margin can be broadened, where the beam tilt margin means a permissible limit of tilt of the optical axis of the focussed beam relative to the normal of the optical disk to be reproduced. That is to say, when the optical disk is thin, coma aberration and spherical aberration caused by tilt of the optical axis of the focussed beam relative to the normal of the optical disk can be relaxed, and the objective lens with high NA can be adopted. When the objective lens with high NA is used, the spot with a smaller diameter can be focussed, and therefore the information pit with a smaller diameter can be reproduced. Accordingly, the information stored in the optical disk can be noticeably increased, and an optical data storage with high capacity can by realized.

The reason is summarized as follows. The optical head apparatus according to the invention comprises the objective lens with the small effective NA for the incident laser beam, which conforms to the substrate thicknesses of the optical disks, and spherical aberration caused by the difference in the substrate thickness can be compensated. The effective diameter of the signal laser beam reflected by the optical disk is larger than that of the incident laser beam on the objective lens, in other words, the effective NAs of the objective lens for the incident and reflected laser beams are different from each other. Accordingly, high resolvability can be achieved by the objective lens with the low effective NA.

Moreover, in the optical head apparatus according to the invention, the circular aperture is provided in front of the semiconductor laser in order to obtain the different NAs of the objective lens for the incident and reflected laser beams. Furthermore, preparing for reproducing the recorded signal on the optical disk with the wavelength dependent characteristic, the optical head apparatus are provided with the plural semiconductor lasers of the different lasing wavelength, and is applicable to the optical disks of all kinds.

As compared with the optical head apparatuses of other kinds, which cope with the situation that the substrate thickness of the optical disk deviates from the designed value, wavefront aberration occurs, and reproducing-recorded signal becomes unsatisfactory; for example, an optical head apparatus provided with twin objective lenses, an variable aperture objective lens or a dual focus objective lens integrated with a hologram; the optical head apparatus according to the invention comprises no complicated mechanism in itself, is low priced and does not degrade recorded signal-reproducing characteristic by aberration. Moreover, high efficiency in light utilization, excellent reproducing characteristic, high access speed and high bit rate data translation can be achieved by the optical head apparatus according to the invention.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head apparatus comprising:

a first semiconductor laser having a first laser wavelength for irradiating an optical disk, a second semiconductor laser having a second laser wavelength for irradiating said optical disk, wherein said second laser wavelength is different from said first lasing wavelength, a multiplexer for multiplexing an incident laser beam, emitted from said first semiconductor laser, and a laser beam emitted from said second semiconductor laser, an objective lens for both focussing said incident laser beam, emitted by said first semiconductor laser, and said laser beam emitted from said second semiconductor laser, and also collimating a reflected laser beam from said optical disk, means for limiting an effective diameter of said incident laser beam so that an effective numerical aperture NA of said objective lens for said incident laser beam is reduced, said objective lens for collimating said reflected laser beam so that said effective NA of said objective lens for said reflected laser beam is higher than that for said incident laser beam by more than 0.1, and means for reproducing a signal, recorded on said optical disk, based on said reflected laser beam focussed thereon.

2. An optical head apparatus according to claim 1, wherein:

said effective NA of said objective lens for said incident laser beam conforms to a substrate thickness of said optical disk and a spherical aberration caused by said objective lens can be compensated.

3. An optical head apparatus according to claim 1, wherein:

said means for limiting said effective diameter of said incident laser beam is a circular aperture located in front of said first semiconductor laser.

4. An optical head apparatus comprising:

a first semiconductor laser having a first laser wavelength for irradiating an optical disk;

a second semiconductor laser having a second laser wavelength for irradiating said optical disk, said second lasing wavelength being different from said first laser wavelength;

a multiplexer for multiplexing an incident laser beam, emitted from said first semiconductor laser, and a laser beam emitted from said second semiconductor laser;

an objective lens for both focusing said incident laser beam, emitted by said first semiconductor laser and said laser beam emitted from said second semiconductor laser, and also collimating a reflected laser beam from said optical disk;

a circular aperture for limiting an effective diameter of said incident laser beam so that an effective numerical aperture NA of said objective lens for said incident laser beam is reduced;

said objective lens for collimating said reflected laser beam so that said effective NA of said objective lens for said reflected laser beam is higher than that for said incident laser beam by more than 0.1; and a reproducer for reproducing a signal, recorded on said optical disk, based on said reflected laser beam focused thereon.

5. An optical head apparatus according to claim 4, wherein:

said effective NA of said objective lens for said incident laser beam conforms to a substrate thickness of said optical disk so that a spherical aberration caused by said objective lens can be compensated.

6. An optical head apparatus according to claim 4, wherein:

said circular aperture is located in front of said first semiconductor laser.

* * * * *